US012499118B2

(12) United States Patent
Banerjee et al.

(10) Patent No.: US 12,499,118 B2
(45) Date of Patent: Dec. 16, 2025

(54) SYSTEM AND METHOD FOR SYNCHRONIZATION OF ASYNCHRONOUS DATASETS (71) Applicant: Morgan State University, Baltimore, MD (US)

(72) Inventors: Snehanshu Banerjee, Edgewood, MD (US); Mansoureh Jeihani, Timonium, MD (US); Mahmoud Ayman Sayed, Cairo (EG)

(73) Assignee: Morgan State University, Baltimore, MD (US)

( * ) Notice: Subject to any disclaimer, the term of this patent is extended or adjusted under 35 U.S.C. 154(b) by 873 days.

(21) Appl. No.: 17/237,630

(22) Filed: Apr. 22, 2021

(65) Prior Publication Data

US 2021/0334289 A1 Oct. 28, 2021

Related U.S. Application Data (60) Provisional application No. 63/013,640, filed on Apr. 22, 2020.

(51) Int. Cl.
*G06F 3/01* (2006.01)
*G06F 16/25* (2019.01)
(Continued)

(52) U.S. Cl.
CPC .......... *G06F 16/254* (2019.01); *G06F 3/013* (2013.01); *G06F 30/20* (2020.01); *G06V 40/19* (2022.01); *H04N 23/90* (2023.01)

(58) Field of Classification Search
CPC ........ G06F 16/254; G06F 3/013; G06F 30/20; G06F 30/15; G06V 40/19; G06V 20/64; G06V 40/18; H04N 23/90; G01S 5/16
See application file for complete search history.

(56) References Cited

U.S. PATENT DOCUMENTS 10,222,228 B1 * 3/2019 Chan ............... G06F 3/0481
2004/0252027 A1 * 12/2004 Torkkola ............. G08B 21/06
340/576
(Continued)

OTHER PUBLICATIONS

P. Pawar, T. Anthony, B. McManus and D. Stavrinos, "Data Reduction Solution for Driving Simulator," 2020 SoutheastCon, Raleigh, NC, USA, p. 1-7, Mar. 2020 (Year: 2020).*
(Continued)

*Primary Examiner* — Rehana Perveen
*Assistant Examiner* — Nupur Debnath
(74) *Attorney, Agent, or Firm* — Whiteford, Taylor & Preston, LLP; Gregory M. Stone (57) ABSTRACT Computer-implemented systems and methods are provided for the synchronization of data from asynchronous datasets to form a merged, synchronized data set, and more particularly to systems and methods for merging disparate and asynchronous data sets that include common dimensions, such as space and time dimensions, and more particularly space and time data relating to a driving simulation environment (such as driving simulator data and eye tracking data having disparate time data resolutions), to enable data extraction from and analysis of the merged, synchronized data set. A driving simulator system includes a driver interface having driving controls and a display and creates driving simulator data files for each driver of the driving simulator system having data entries that are captured at a first timing frequency. Likewise, an eye tracking system includes eye tracking cameras for tracking a driver's eye movements when using the driving simulator system and creates eye tracking data files for each driver of the driving simulator system having data entries that are captured at a second timing frequency that is different from the first timing frequency at which driving simulator data is captured. A driving behavior analysis computer is also provided (Continued)

that merges the asynchronous data embodied in each of the driving simulator data files and the eye tracking data files to form a single merged data file based upon an interpolation of data entries in those data files. The merged data files may then be further processed to enable extraction and analysis of the merged data in order to identify various driver behaviors.

21 Claims, 5 Drawing Sheets

(51) Int. Cl.
  *G06F 30/20* (2020.01)
  *G06V 40/19* (2022.01)
  *H04N 23/90* (2023.01)

(56) References Cited

U.S. PATENT DOCUMENTS

| | | | | |
|---|---|---|---|---|
| 2014/0210625 A1* | 7/2014 | Nemat-Nasser | ....... | G08B 21/06 340/575 |
| 2014/0214374 A1* | 7/2014 | Haas | ........ | G06F 30/20 703/2 |
| 2018/0126901 A1* | 5/2018 | Levkova | ........ | B60W 40/09 |
| 2018/0253963 A1* | 9/2018 | Coelho de Azevedo | .............. | G06V 20/597 |
| 2021/0146944 A1* | 5/2021 | Kundu | ......... | B60W 50/085 |

OTHER PUBLICATIONS

J-C. Popieul, et al., "Automatic Processing of a Car Driver Eye Scanning Movements on a Simulated Highway Driving Context," Proceedings of the IEEE Intelligent Vehicles Symposium 2000, p. 14-18 (Year: 2000).*

Samira Ahangari et al.; "Quantifying the Effect of On-Street Parking Information on Congestion Mitigation using a Driving Simulator"; Transportation Research Record 2018, vol. 2672(8) 920-929 (Year: 2018).*

Jennifer Butters et al.; "Gender differences and demographic influences in perceived concern for driver safety and support for impaired driving countermeasures"; Journal of Safety Research 43 (2012) 405-411 (Year: 2012).*

* cited by examiner

FIG. 1

DRIVER A – Driving Simulator Data File — 220

| Driving Simulator Time | Driving Simulator Vehicle Coordinates | Speed | Acceleration / Deceleration | ... |
|---|---|---|---|---|
| ... | | | | |
| 200 | (X1, Y1, Z1) | 42 | +2 | ... |
| 300 | (X2, Y2, Z2) | 34 | -3 | ... |
| 400 | (X3, Y3, Z3) | 28 | -3.5 | ... |
| ... | | | | |

- 221(a)
- 221(b)
- 221(c)

DRIVER A – Eye Tracker Data File — 320

| Eye Tracker Time | Eye Position Coordinates | Physical World Coordinates | ... |
|---|---|---|---|
| ... | | | |
| 170 | (X1, Y1, Z1)Eye | (X1, Y1, Z1)Phys | ... |
| 200 | (X2, Y2, Z2)Eye | (X2, Y2, Z2)Phys | ... |
| 230 | (X3, Y3, Z3)Eye | (X3, Y3, Z3)Phys | ... |
| 260 | (X4, Y4, Z4)Eye | (X4, Y4, Z4)Phys | ... |
| 290 | (X5, Y5, Z5)Eye | (X5, Y5, Z5)Phys | ... |
| 320 | (X6, Y6, Z6)Eye | (X6, Y6, Z6)Phys | ... |
| 350 | (X7, Y7, Z7)Eye | (X7, Y7, Z7)Phys | ... |
| 380 | (X8, Y8, Z8)Eye | (X8, Y8, Z8)Phys | ... |
| 410 | (X9, Y9, Z9)Eye | (X9, Y9, Z9)Phys | ... |
| ... | | | |

| DRIVER A – Merged Data File | | | | | |
|---|---|---|---|---|---|
| Driving Simulator Time | Driving Simulator Vehicle Coordinates | Speed | Acc / Decel | Eye Position Coordinates | Physical World Coordinates |
| ... | | | | | |
| 200 | (X1, Y1, Z1) | 42 | +2 | (X2, Y2, Z2)Eye | (X2, Y2, Z2)Phys |
| 300 | (X2, Y2, Z2) | 34 | -3 | (X5, Y5, Z5)Eye | (X5, Y5, Z5)Phys |
| 400 | (X3, Y3, Z3) | 28 | -3.5 | (X9, Y9, Z9)Eye | (X9, Y9, Z9)Phys |
| ... | | | | | |

SYSTEM AND METHOD FOR SYNCHRONIZATION OF ASYNCHRONOUS DATASETS

CROSS REFERENCE TO RELATED APPLICATIONS

This application is based upon and claims the benefit of U.S. Provisional Application No. 63/013,640 titled "Method to Merge Datasets with Space and Time Variables," filed with the United States Patent & Trademark Office on Apr. 22, 2020, the specification of which is incorporated herein by reference in its entirety.

GOVERNMENT LICENSE RIGHTS

Portions of the invention described herein were made with government support under Contract No. 69A43551747123 awarded by the United Sates Department of Transportation. The U.S. government may have certain rights in the invention.

FIELD OF THE INVENTION

This invention relates generally to systems and methods for synchronization of data from asynchronous datasets to form a merged, synchronized data set, and more particularly to systems and methods for merging disparate and asynchronous data sets that include common dimensions, such as space and time dimensions, and more particularly space and time data relating to a driving simulation environment, to enable data extraction from and analysis of the merged, synchronized data set.

BACKGROUND OF THE INVENTION

Connected, smart, and automated vehicles offer promising developments that assist drivers with certain tasks, which may aid in the reduction of accidents and their associated injuries and greater convenience and comfort for drivers and other vehicle occupants. A variety of applications have been developed deploying those technologies and others are continuously developing, including applications intended to improve safety inside of the vehicle (such as sensing driver fatigue, assisting with braking and lane change operations in emergencies, etc.). However, given the newness of such applications, drivers' reactions to them are not yet fully understood, despite the fact that understanding their expected reactions to such applications is an essential element in ensuring their effectiveness and successful implementation. Reaction factors such as a driver's braking, steering and throttle control, change in speed, and eye gaze movements are all relevant to how successful a particular application may be in positively affecting the driver's behavior.

In order to develop an understanding of drivers' interactions with and reactions to such applications, evaluation in an environment other than on-the-road testing is preferable, particularly where the systems being tested are intended to mitigate dangerous situations. Thus, testing such applications in a simulated driving environment may be preferred, as it removes the physical risk element from the evaluation process. More particularly, performing evaluations to determine a driver's reaction to such applications in a driving simulator environment allows for the safe evaluation of whether such applications, and the varied warnings that they generate during driving, are effective in mitigating risks and/or distractions, typical reaction times of drivers to such warnings, other driver reactions and behaviors in interacting with such applications, and other factors that will help to optimize the functionality of such applications.

A key aspect of such evaluations is determining where a driver's gaze is directed at key times during a drive. For instance, if a red-light warning is triggered by such an application because the driver is approaching a red light at an excessive speed, it may be because the driver's attention is directed away from the traffic light. Having such detail as to what caused the warning to issue helps to better understand the driver's overall interaction with the application that generates the warning, what driver behavior triggers it, and what the driver does in response to it. Eye tracking devices have been employed in driving simulator environments, but the integration of the disparate systems has proven difficult, particularly in light of the varied time resolution of data collection from those disparate systems. More particularly and by way of non-limiting example, data from a driving simulator may be collected and stored in time domain snapshots every 100 ms, while data from an eye tracking application may be collected and stored in time domain snapshots every 30 ms. In this case, it becomes necessary to process those disparate data sets in order to synchronize them to obtain a clear understanding of where the driver's gaze was directed at the time of a particular event of interest, such as a sudden braking maneuver, a rapid lane change, the running of a red light, or the like. However, such synchronization efforts have proven difficult absent significant expense to develop complex software-implemented solutions, which in turn have limited the wide-scale adoption of such combined driving simulation and eye gaze tracking systems.

Thus, there remains a need in the art for systems and methods for synchronization of the disparate data from the asynchronous datasets of a driving simulator and an eye gaze tracking system to form a merged, synchronized data set, so as to enable data extraction from and analysis of the merged, synchronized data set, without the developmental expense and complexity that has previously surrounded the development and deployment of such systems and methods.

SUMMARY OF THE INVENTION

Disclosed herein are computer-implemented systems and methods for the synchronization of data from asynchronous datasets to form a merged, synchronized data set, and more particularly to systems and methods for merging disparate and asynchronous data sets that include common dimensions, such as space and time dimensions, and more particularly space and time data relating to a driving simulation environment (such as driving simulator data and eye tracking data having disparate time data resolutions), to enable data extraction from and analysis of the merged, synchronized data set. In accordance with certain aspects of an exemplary embodiment, those systems and methods include a driving simulator system that includes a driver interface having driving controls and a display, and which creates driving simulator data files for each driver of the driving simulator system. Those driving simulator data files comprise data entries that are captured at a first timing frequency—i.e., collection of data snapshots or data samples from the driving simulator system begins at a time t=0, and thereafter data samples continue to be collected at a first specific timing interval, such as once every 100 ms, that is designated by the driving simulator system. Likewise, the systems and methods set forth herein include an eye tracking system that includes eye tracking cameras for tracking a driver's eye movements when using the driving simulator system, and which create eye tracking data files for each driver of the driving simulator system. Those eye tracking data files comprise data entries that are captured at a second timing frequency that is different from the first timing frequency at which driving simulator data is captured. More particularly, the eye tracking system collects eye tracking data snapshots or data samples starting at time t=0 (or possibly even a time that might slightly vary from time t=0 at which the driving simulator system begins collecting data), and thereafter continues to collect eye tracking data samples at a second specific timing interval, such as once every 30 ms, that is designated by the eye tracking system. As a result of those differing data collection timing intervals, the resulting driving simulator data is not synchronized with the eye tracking data. Thus, such systems and methods further employ a driving behavior analysis computer that is capable of merging the asynchronous data embodied in each of the driving simulator data files and the eye tracking data files to form a single merged data file based upon an interpolation of data entries in those data files, in turn coordinating the spatial coordinates embodied in the two files in a single file without the complexity or expense associated with the real-time integration of such data. The merged data files may then be further processed to enable extraction and analysis of the merged data in order to identify various driver behaviors.

In accordance with certain aspects of an embodiment of the invention, a system is provided for synchronizing asynchronous data from a driving simulator system and an eye tracking system, comprising a driving simulator system comprising a driving interface having driving controls, a display, and computer executable driving simulator code configured to execute a driving simulation and to create a driving simulator data file for each of a plurality of drivers of the driving simulator system, wherein each driving simulator data file comprises data snapshots captured at a first time frequency. The system also comprises an eye tracking system comprising a plurality of cameras and computer executable eye tracking code configured to create an eye tracking data file for each of the plurality of drivers of the driving simulator system, wherein each eye tracking data file comprises data snapshots captured at a second time frequency different from the first time frequency. The system still further comprises a driving behavior analysis computer in data communication with each of the driving simulator system and the eye tracking system. The driving behavior analysis computer has a processor executing computer instructions configured to receive one of the driving simulator data files associated with a first one of the plurality of drivers; receive one of the eye tracking data files associated with the first one of the plurality of drivers; and generate a merged data file for the first one of the plurality of drivers, wherein the merged data file comprises data from one of the driving simulator data files and a selection of data from one of the eye tracking data files that most closely matches in time each data snapshot in the driving simulator data files.

In accordance with further aspects of an embodiment of the invention, a method is provided for synchronizing asynchronous data from a driving simulator system and an eye tracking system, comprising the step of receiving at a driving behavior analysis computer from a driving simulator system, a driving simulator data file for each of a plurality of drivers of the driving simulator system, wherein each driving simulator data file comprises data snapshots captured at a first time frequency, wherein the driving simulator system comprises a driving interface having driving controls, a display, and computer executable driving simulator code configured to execute a driving simulation and to create the driving simulator data files. The method further comprises receiving at the driving behavior analysis computer from an eye tracking system an eye tracking data file for each of the plurality of drivers of the driving simulator system, wherein each eye tracking data file comprises data snapshots captured at a second time frequency different from the first time frequency, wherein the eye tracking system comprises a plurality of cameras and computer executable eye tracking code configured to create the eye tracking data files. The method still further comprises generating at the driving behavior analysis computer a merged data file for each of the plurality of drivers, wherein the merged data file comprises data from the driving simulator data file and a selection of data from the eye tracking data file that most closely matches in time each data snapshot in the driving simulator data file.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
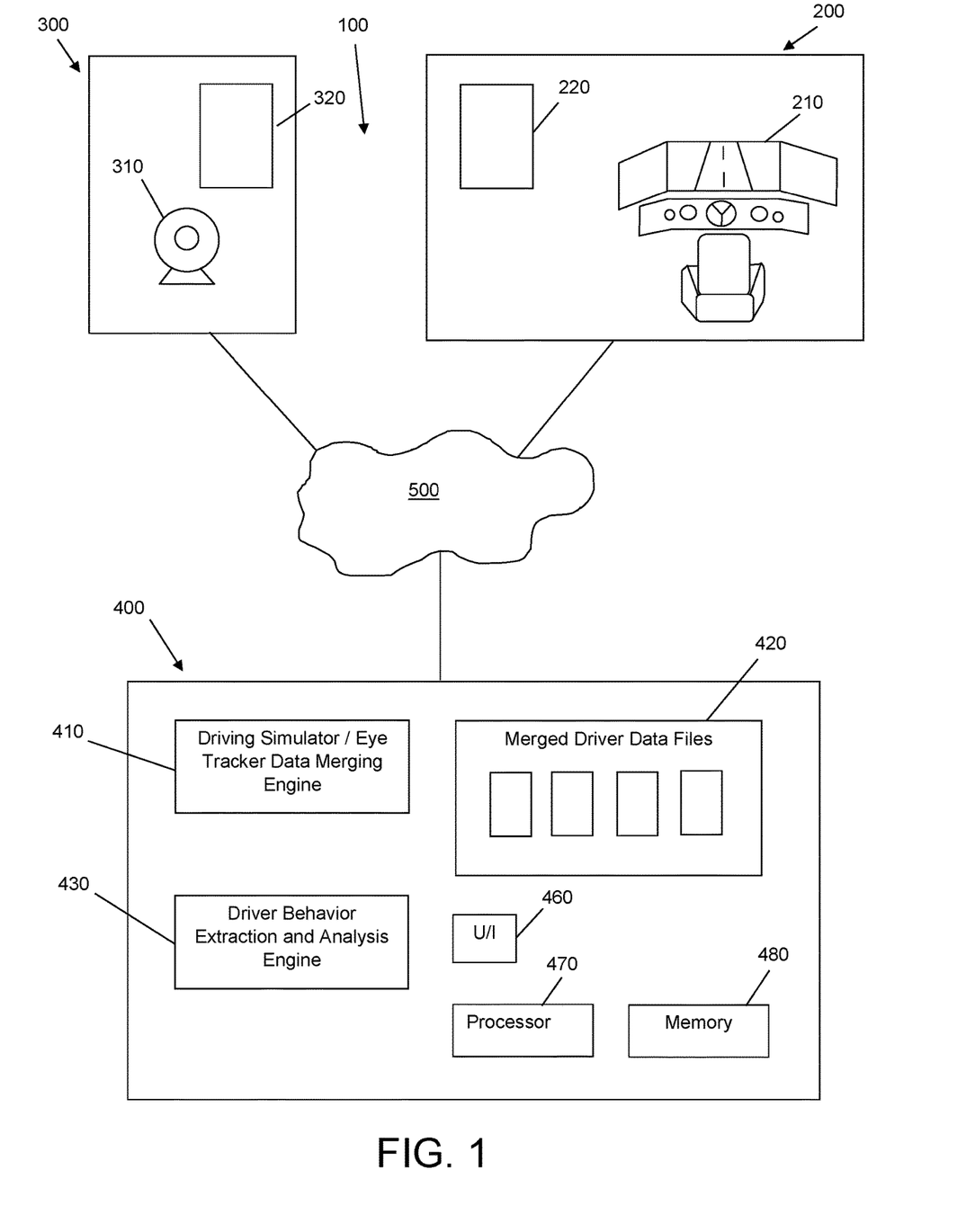
FIG. 1 is a schematic view of a system for synchronizing asynchronous data from a driving simulator system and an eye tracking system according to certain aspects of an embodiment of the invention.

By way of summary, systems and methods configured in accordance with certain aspects of the invention provide a driving simulator equipped with an eye tracking device capable of tracking the driver's eye movements during their interaction with the driving simulator system, collecting data from each of the driving simulator and eye tracking systems at a driving behavior analysis computer, merging the driving simulator and eye tracking systems data (each having a disparate data format) into a single, merged data file, and providing data indicative of driver behaviors, such as (by way of non-limiting example) a driver's braking, steering and throttle control, change in speed or direction, acceleration and deceleration, and eye gaze movements, all in response to environmental factors (e.g., surrounding vehicles, surrounding buildings, road conditions and road hazards, traffic signals, and warning indicators generated by vehicle automation tools). In accordance with certain aspects of an embodiment of the invention, FIG. 1 shows such a system 100 including a driving simulator system 200, an eye tracking system 300, and a driving behavior analysis computer 400, all of which may communicate with one another through a network 500, such as a wired or wireless communications network such as a local area network, or via a wide area network such as the Internet.

In an exemplary configuration, driving simulator system 200 includes a driver interface 210 that may include a steering wheel, accelerator and brake pedals, gear shift, dashboard, and screens that provide the driver with a panoramic view of their simulated driving environment. In an exemplary configuration, driving simulator system 200 may include driving simulator software that is commercially available from FORUM8 Company, Ltd. of Tokyo, Japan. Driving simulator system 200 enables the creation and design of network elements, such as traffic signals, differing terrains, road alignments, signage, traffic generation, and varying weather conditions, as well as static objects such as three-dimensional buildings and trees. Driving simulator system 200 may thus allow for the creation of a highly realistic network of actual cities, with drivers being capable of choosing their own route to reach their intended destinations. Driving simulator system 200 may capture data such as steering wheel control, braking, acceleration, travel times, lane changing information, traffic mix, and speed, among such other simulated driving data as may be desired by those skilled in the art. Preferably, driving simulator data file 220 collects and stores such simulated driving data for each simulated driving session of a driver, which simulated driving data may then be electronically transmitted to driving behavior analysis computer 400 for further processing as discussed in greater detail below, by way of network 500.

Preferably, for each driver that uses driving simulator system 200, socio-demographic data for such driver is also collected, which socio-demographic data may include by way of non-limiting example information concerning the driver's age, gender, education level, type of car driven, current employment status, driving license type, annual household income, size of household, knowledge about Connected and Automated Vehicles (CAV), past driving experience with CAV applications, their trust in such applications, and their willingness to pay for such applications. Such socio-demographic data may be used by driving behavior analysis computer 400 in correlating driving behavior with particular CAV applications and socio-demographic characteristics.

Likewise, eye tracking system 300 includes one or more cameras 310 capable of tracking the movement of the driver's eyes to determine the location of their gaze. For example, cameras 310 may identify a particular landmark on the display of driver interface 210 where the driver was looking at a particular moment, such as when a warning message is presented by automated systems on the vehicle, traffic signals, pedestrians, other vehicles, or elements in the surrounding environment. Likewise, cameras 310 may show that the driver was looking away from the display of driver interface 210 at such a moment, including for example at the dashboard, at the driver's cell phone, or the like. In an exemplary configuration, cameras 310 of eye tracking system 300 may comprise an eye tracking system that is commercially available from Tobii Pro Labs of Stockholm, Sweden, which comprises a driver-worn assembly capable of analyzing the eye and head movement of the driver, and which in an exemplary configuration includes 4 eye cameras, a gyro and accelerometer, and a wide angle high-definition scene camera. The wearable, head-mounted eye tracking tool tracks the driver's gaze in real time. The eye tracking data may be mapped to a coordinate system that is relative to the eye tracking device 300. Real world mapping is accomplished via the commercial software provided with the eye tracking device 300, which maps gaze points to static objects within the simulator environment. Preferably, eye tracking data file 320 collects and stores eye tracking data for each simulated driving session of a driver, which eye tracking data may then be electronically transmitted to driving behavior analysis computer 400 for further processing as discussed in greater detail below.

As driving simulator system 200 and eye tracking system 300 are separate systems with separate data formats, they may collect data at time resolutions that vary from one another. This disparate, unsynchronized data format makes their merge into a single application a potentially difficult task that must be overcome in order to generate a single, usable merged data file that may be used to fully analyze and report driver behaviors at particular times of interest during a driving session. For example, while both the driving simulator data files 220 and eye tracking data files 320 may each comprise data that has both timestamp data and x, y, and z coordinate data, the frequency of data collection for driving simulator system 200 may be at, by way of non-limiting example, a frequency of one data snapshot every 100 ms, and the frequency of data collection for eye tracking system 300 may be at, by way of non-limiting example, a different frequency of one data snapshot every 30 ms. In this environment, it is necessary to synchronize the two asynchronous data sets to match the closest available data snapshot from eye tracking system 300 to each data snapshot from driving simulator system 200.

During a driver's simulated driving session using driving simulator system 200 and eye tracking system 300, the driver may be presented with various scenarios that will enable data to be collected that reflects how a user responds to those scenarios, such as how the driver responds to a jaywalking pedestrian in the road and a warning of the presence of such pedestrian, how they respond to a traffic light changing to red and a warning of an impending red light traffic infraction, how they respond to a vehicle in front of their own vehicle and a warning of an impending collision with such vehicle, how they respond to an upcoming curve in a road and a warning of excessive speed upon entering into such a curve, and how they respond to an instruction to resume control from autonomous operation of the vehicle. Thus, a driving simulator/eye tracker data merging engine 410 of driving behavior analysis computer 400 may generate waypoints, such as particular timestamps, during a driver's simulated driving session that are of particular interest because they correspond to one or more of the foregoing events. For example, a human observer may watch the driver operate driving simulator system 200, and upon seeing one of the foregoing events take place in the simulated environment, may thereafter engage user interface 460, such as by clicking an electronic "log event" button or the like, to log the time of such event. In a more particularized example, the observer may witness that the driver is approaching a specific intersection that is equipped with a red light camera, and that the driving simulator system 200 has generated a warning to the driver that they are traveling at a speed that may cause them to run the red light, at which point the observer may log that event, thus creating a timestamp for such a waypoint event that may be further analyzed after the driving session has been completed. Likewise, the observer may simply log such events without a warning, such as when the driver is approaching a simulated intersection for which a light change to red has been programmed to automatically trigger each time the driver approaches that intersection. Still further, such events may be logged independently and automatically by driving simulator system 200 to gauge normal operation at certain time intervals, operation at particular places or events of interest during the simulated driving session, or upon the occurrence of specific conditions caused by the driver, such as a sudden turn or sudden application of the brake or accelerator pedals. In each of these cases, in order to have fully informed data at each such waypoint that includes both driving simulator data and eye tracking data, it will be necessary to synchronize those data to identify and merge the related x, y, and z coordinates as close to the time of each waypoint as possible, the process for which is discussed in detail below. The resulting analysis of the properly merged driver data file 420, which is preferably stored on or otherwise in data communication with driving behavior analysis computer 400, may then show that the driver, by way of non-limiting example, braked or accelerated because another vehicle was approaching, or some other condition that may be observed through analysis of the merged driver data file 420. Such analysis may be carried out by driver behavior extraction and analysis engine 430, as discussed in greater detail below. Driving behavior analysis computer 400 also includes a processor 470 and memory 480 for carrying out and managing the various computing processes of driving behavior analysis computer 400.

Figure 2:
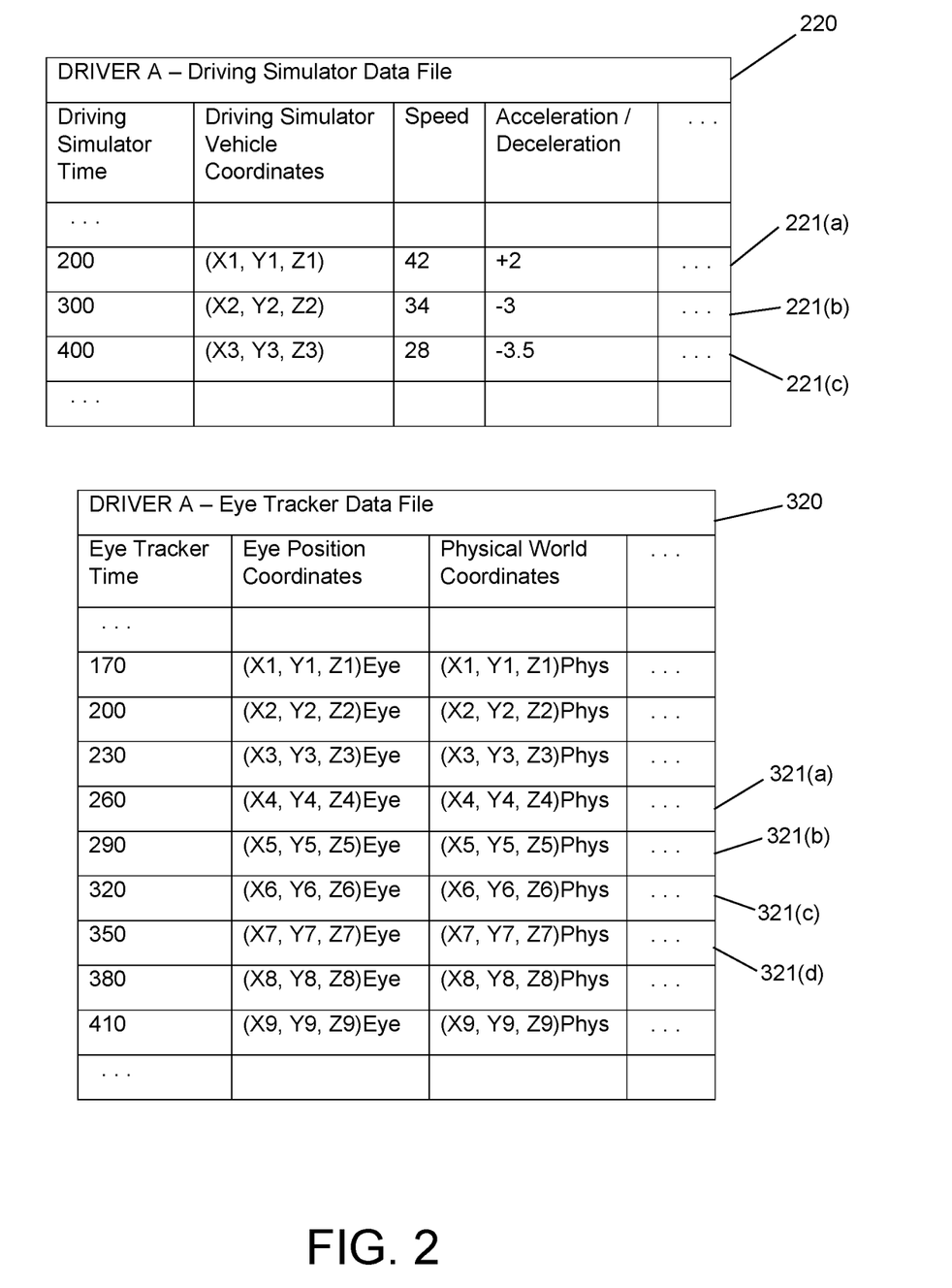
FIG. 2 is a schematic view of data files generated by elements of the system of FIG. 1.

FIG. 2 provides exemplary representations of driving simulator data files 220, eye tracking data files 320, and merged driver data files 420. Those skilled in the art will readily recognize that driving simulator system 200 and eye tracking system 300 will generate more data than that shown in the exemplary representation of FIG. 2, such that the data files and the variables shown are representative of only a portion of such data, and other variables (e.g., road conditions, weather conditions, presence and location of adjacent or nearby vehicles, pedestrians, or obstacles, etc.) may readily be included without departing from the spirit and scope of the invention. As shown in FIG. 2, driving simulator data file 220 is generated from driving simulator system 200 as the user is conducting their simulated driving session. Data is collected at a first timing interval, such as (by way of non-limiting example) at every 100 ms. Thus, multiple timestamped records 221(*a*), 221(*b*), and 221(*c*) may be generated at 200 ms, 300 ms, and 400 ms from a particular start time. Each such record 221(*a*), 221(*b*), and 221(*c*) may individually comprise data from that instant in time that corresponds to the driving simulator vehicle coordinates in the virtualized environment, a vehicle speed, and a measure of the simulated vehicle's acceleration or deceleration at that instant, among other variables as noted above. Similarly, eye tracking data file 320 is generated from eye tracking system 300 as the user is conducting their simulated driving session, in which data in this exemplary configuration is collected at a second timing interval, such as (by way of non-limiting example) at every 30 ms. Thus, multiple timestamped records 321(*a*), 321(*b*), 321(*c*), and 321(*d*) may be generated, by way of non-limiting example, at 260 ms, 290 ms, 320 ms, and 350 ms from the same start time as that referenced above in the creation of driving simulator data file 220. Each such record 321(*a*), 321(*b*), 321(*c*), and 321(*d*) may individually comprise data from that instant in time that corresponds to the coordinates of the driver's eye as detected by the camera 310 and the driver's physical world gaze target (e.g., a specific location on the screens or dashboard gauges of driver interface 210 or elsewhere in the physical space around the driver). Where the driver's physical world gaze target is a location on the screens of driver interface 210, this will ultimately indicate a location in the virtualized environment of driving simulator system 200; however, before such point may be determined, the discrepancy between the variously timestamped records 321(*a*), 321(*b*), 321(*c*), and 321(*d*) of eye tracker data file 320 must be resolved with a single one of the timestamped records 221(*a*), 221(*b*), and 221(*c*) of driving simulator data file 220.

Preferably, as each of driving simulator data files 220 and eye tracker data files 320 will include more variables and data than that shown in the exemplary representations of FIG. 2, a user may engage driving simulator/eye tracker data merging engine 410 to select those particular variables from each of those files that are of interest and that are to be included in a single, new, synchronized merged driver data file 420, so as to enable future analysis of factors that are dependent upon those variables.

In order to accomplish such synchronized merger of the asynchronous driving simulator data file 220 and eye tracker data file 320 for a particular driver's driving session, a user may engage driving simulator/eye tracker data merging engine 410 to perform an interpolation of the records in each such data file. To do so, the user may select a threshold value that represents the largest possible difference between the time variables that are to be merged. In the exemplary case discussed above and shown in FIG. 2, the largest possible difference between the time variables is 100 ms, such that the threshold value may be established as 100 ms. Likewise, the user may select a ratio representative of the number of rows in the secondary data set (in this case, the eye tracker data file 320) that are to be compared against a single row of the primary data set (here, the driving simulator data file 220). In this case, as there are two records in eye tracker data file 320 that will best correspond to a single entry in driving simulator data file 220 (i.e., record 321(b) at 290 ms and record 321(c) at 320 ms in eye tracker data file 320, which are closest to a single record in driving simulator data file 220, namely record 221(b) at 300 ms), the ratio may be set to 2. In this case, driving simulator/eye tracker data merging engine 410 may calculate the difference between the time-stamp of record 221(b) and the timestamps of each of records 321(b) and 321(c), and select the record from eye tracker data file 320 that has the smallest difference (which in this case is record 321(b) at 290 ms, which differs from record 221(b) at 300 ms by only 10 ms, as opposed to record 321(c) at 320 ms, which differs from record 221(b) by 20 ms) for merger with record 221(b) in driving simulator data file 220. For any records in eye tracker data file 320 that exceed the established threshold, such records may be omitted from further analysis with respect to the current timestamp record of driving simulator data file 220 that is undergoing processing.

Those skilled in the art will recognize that threshold and ratio may change from dataset to dataset depending upon the specific structure of that data—for example, the specific time domain resolution of the datasets (e.g., 100 ms snapshots for driving simulator data files 220 and 30 ms snapshots for eye tracking data files 320). The objective in each such case is to select a threshold and ratio value that is suitable to that particular data structure that will allow a comparison of the closest values of the secondary data set (e.g., eye tracker data) to a single row entry in the main data set (e.g., the driving simulator data). Thus, in each case, ultimately only those closest values are compared (and then the value having the lowest difference is selected), but those closest values are identified by selecting threshold and ratio values based on the structure of the data set.

Through the foregoing merge operation, merged driver data file 420 is generated, which preferably comprises multiple rows equal in number to the number of records in driving simulator data file 220, with select, merged data records from eye tracker data file 320. More particularly, merged driver data file 420 may include the driving simulator time for each record in driving simulator data file 220, along with those variables or fields that have been selected by the user from both driving simulator data file 220 and eye tracker data file 320 that they may wish to use for further analysis as discussed in greater detail below. For example, as shown in FIG. 2, merged driver data file may provide for each driving simulator time entry each of the driving simulator vehicle coordinates in the virtual environment, vehicle speed, vehicle acceleration or deceleration, and for the merged fields from the eye tracker data file the driver's eye position coordinates and their physical world gaze target. Merged driver data file 420 also preferably includes at least a calculated driving simulator environment gaze target, which associates the driver's physical world gaze target with the x, y, and z coordinates of that gaze target in the virtualized environment at that particular timestamp. This calculated driving simulator environment gaze target will in turn enable an analyst to review the merged driver data file 420 to determine the location of the user's gaze in that virtualized environment at a particular time of interest, such as at the time of a waypoint that designated the user excessively braking for a red light, in turn enabling an in-depth analysis of the reason for such driver behavior of a sudden breaking event.

Figure 3:
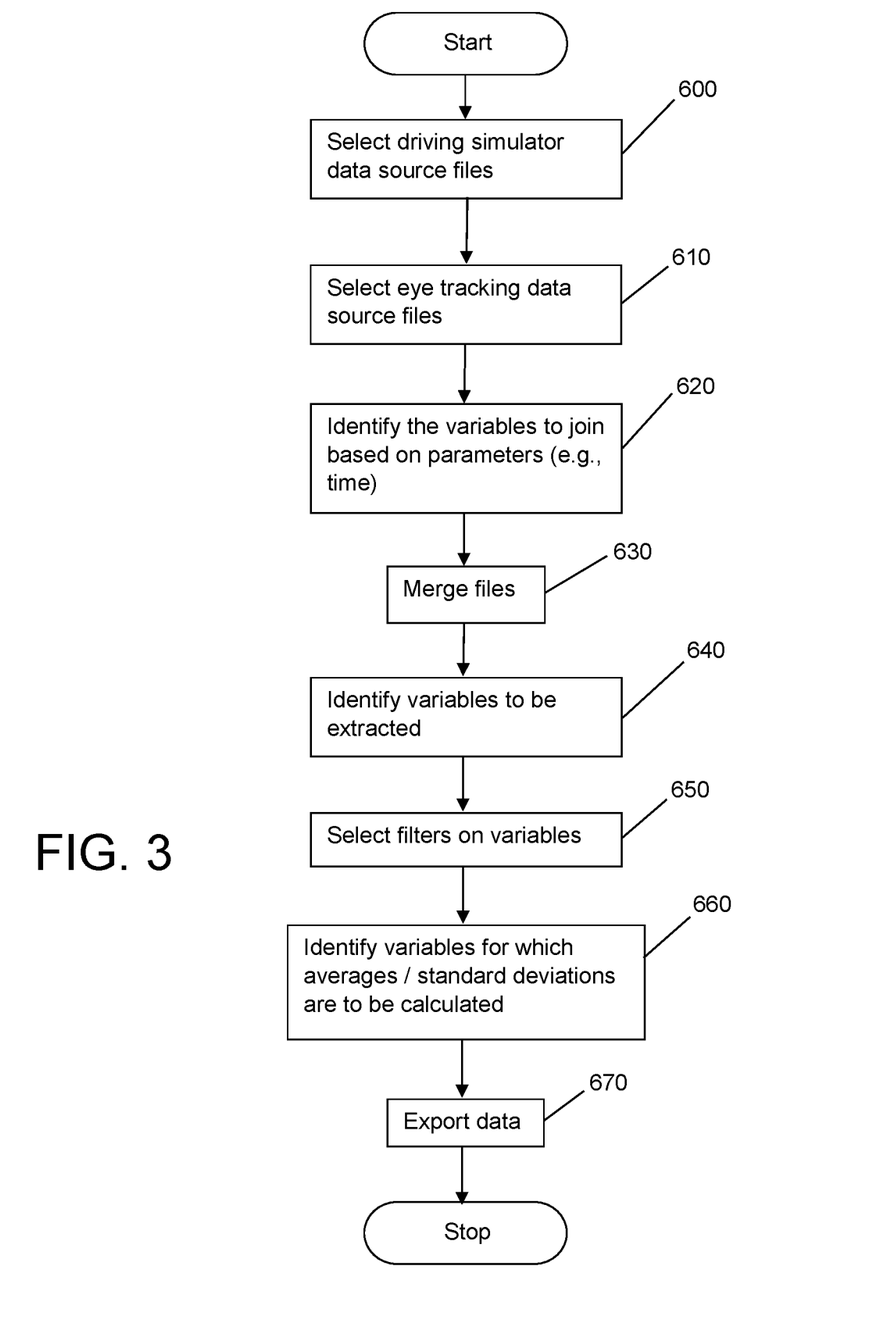
FIG. 3 is a flowchart representing a method for synchronizing asynchronous data from a driving simulator system and an eye tracking system according to further aspects of an embodiment of the invention.

FIG. 3 is a schematic view of a method for merging asynchronous data files as described above, followed by extraction of data from the merged data file for purposes of analysis, and particularly for purposes of determining driver behaviors in response to various conditions experienced in the environment simulated by driving simulator system 200. At step 600, a user may engage driving simulator/eye tracker data merging engine 410 to select driving simulator data files 220 that are to be merged, and at step 610 the user may engage driving simulator/eye tracker data merging engine 410 to select eye tracking data files 320 that are to be merged (i.e., driving simulator data files 220 and eye tracking data files 320 associated with a particular driver's simulated driving session). Next, at step 620, the user may select those variables in each of driving simulator data files 220 and eye tracking data files 320 that they wish to include in the merge operation based on a particular parameter, which in the exemplary case described above is time (as both driving simulator data files 220 and eye tracking data files 320 include a time field or variable). After those variables have been selected, the user may engage driving simulator/eye tracker data merging engine 410 to merge the selected driving simulator data files 220 and eye tracking data files 320 as discussed in detail above, thus creating a merged driver data file 420 at step 630. The user may then at step 640 initiate an extract data operation by selecting those variables from the merged driver data file 420 that they wish to further analyze (e.g., vehicle location, speed, and acceleration/deceleration data in combination with the driver's gaze target around a particular waypoint), at step 650 may designate any data filters that they wish to apply (e.g., selecting only those merged driver data files 420 for drivers in a particular demographic, records for particular locations in the simulated environment, or such other filters as will readily occur to those of ordinary skill in the art), and at step 660 may designate any of those variables for which averages or standard deviations are to be calculated and reported. Finally, at step 670, the user may initiate an export data operation to export the data under analysis, extracted and filtered in accordance with the user's selections, so as to enable further analysis by the user.

The user may thus employ driving behavior extraction and analysis engine 430 to extract and analyze driver behavior based on merged driver data files from one or multiple drivers, which in turn may enable that analyst user to evaluate driver behavior in response to various CAV warnings and processes, such as (i) Pedestrian Collision Warning, in which the driver's interaction with and reaction to a warning that a pedestrian is in the vehicle's path may be evaluated; (ii) Red Light Violation Warning, in which the driver's interaction with and reaction to a warning of an impending red-light infraction may be evaluated, such as where the vehicle's speed is above a pre-determined speed near a signalized intersection and the light is about to turn red; (iii) Forward Collision Warning, in which the driver's interaction with and reaction to a warning of an impending collision with a vehicle or object directly in its path may be evaluated; (iv) Curve Speed Warning, in which the driver's interaction with and reaction to a warning that the driver's vehicle speed exceeds the safe speed limits to navigate an approaching curve or ramp may be evaluated; and (v)

Takeover Reaction Time, in which the driver's interaction with and reaction to an instruction to retake control from automated operation of an autonomous vehicle may be evaluated.

The foregoing systems and methods may thus combine data from any driving simulator with data from any eye tracking device and will function with any data sources providing n-space information (e.g., 3-D space plus time dimension, such that n=4 in this exemplary case), and provide resolved output data that is expressed in a single output file. This technique may also be able to amass a database of "expected behaviors" of drivers, whereby a user analyst may anticipate that based on particular eye gazes, for example, that certain driver behavior reactions are expected.

Driver behaviors, such as braking and acceleration activity, vehicle speed, acceleration and deceleration rate, and such other factors as may be selected by an analyst for review may thus be reported by the driving behavior and analysis computer 400 to the analyst user. Such factors are readily calculable from the data collected from driving simulator system 200 and eye tracking system 300 and combined into the merged driver data file 420 at driving behavior and analysis computer 400. Details of experiments conducted using a combined driving simulator system 200, eye tracking system 300, and driving behavior analysis computer 400 as detailed above are set forth in Banerjee, S., "Evaluation and Validation of the Effect of Connected and Automated Vehicle Safety Applications on Driver Behavior—A Driving Simulator Approach," Morgan State University, Department of Transportation and Urban Infrastructure Studies (Oct. 1, 2019), which publication is incorporated herein by reference in its entirety.

Figure 4:
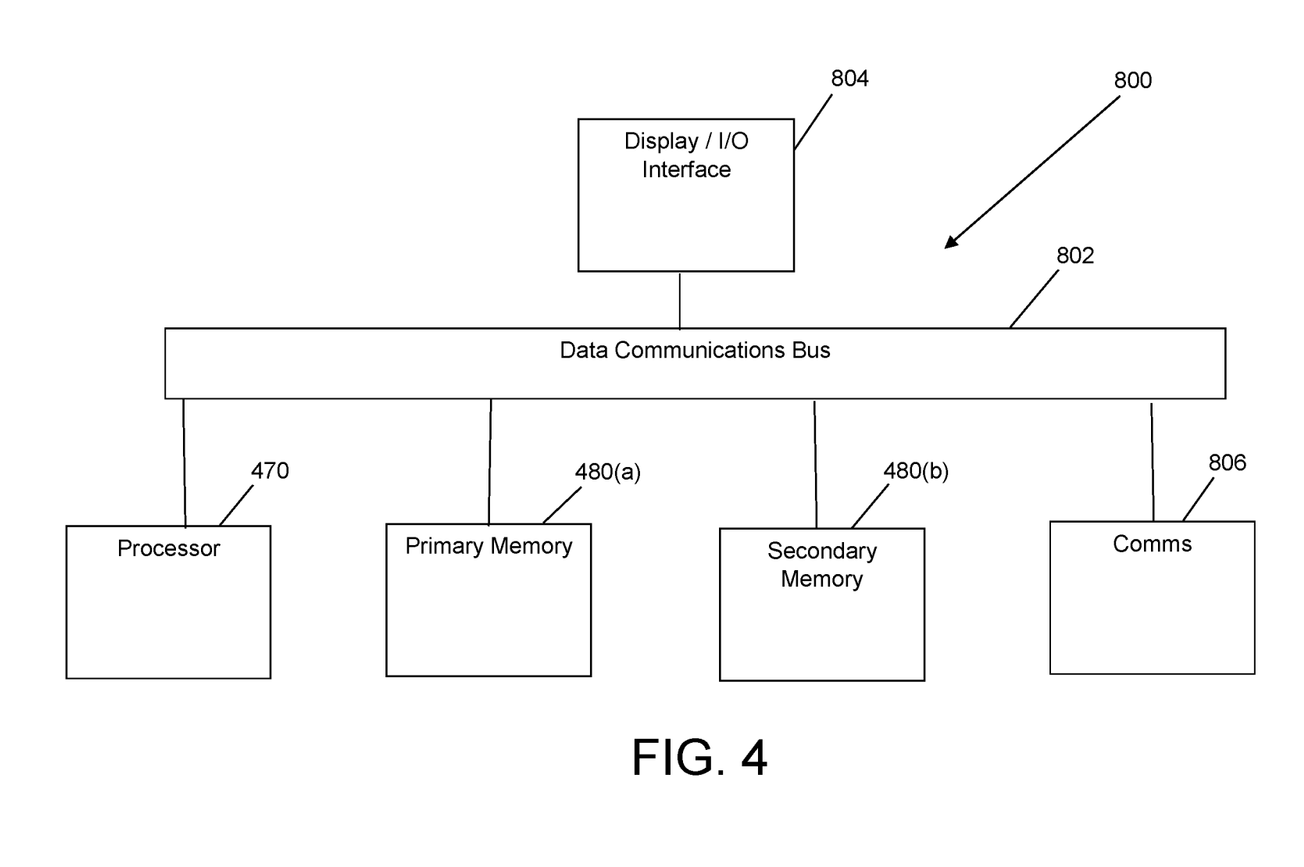
FIG. 4 is a schematic view of an exemplary computer system suitable for implementing the methods described herein.

Next, FIG. 4 shows an exemplary computer system architecture 800 suitable for implementing the methods described herein. Those skilled in the art will recognize that the system of FIG. 1 configured for enabling a driving behavior analysis computer to synchronize and merge driving simulator data with data from an eye tracking device to provide data indicative of driver behaviors, such as (by way of non-limiting example) a driver's braking, steering and throttle control, change in speed or direction, acceleration and deceleration, and eye gaze movements, may take the form of computer system 800 as reflected schematically in FIG. 4, though variations thereof may readily be implemented by persons skilled in the art as may be desirable for any particular installation. In each such case, one or more computer systems 800 may carry out the foregoing methods as computer code.

Computer system 800 includes a communications bus 802, or other communications infrastructure, which communicates data to other elements of computer system 800. For example, communications bus 802 may communicate data (e.g., text, graphics, video, other data) between bus 802 and an I/O interface 804, which may include a display, a data entry device such as a keyboard, touch screen, mouse, or the like, and any other peripheral devices capable of entering and/or viewing data as may be apparent to those skilled in the art. Further, computer system 800 includes processor 470, which may comprise a special purpose or a general purpose digital signal processor. Still further, computer system 800 includes a memory 480, which may include primary memory 480(a), which may include by way of non-limiting example random access memory ("RAM"), read-only memory ("ROM"), one or more mass storage devices, or any combination of tangible, non-transitory memory. Still further, memory 480 of computer system 800 includes a secondary memory 480(b), which may comprise a hard disk, a removable data storage unit, or any combination of tangible, non-transitory memory. Finally, computer system 800 may include communications module 806, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 480(a), secondary memory 480(b), communications module 806, and combinations of the foregoing may function as a computer usable storage medium or computer readable storage medium to store and/or access computer software including computer instructions. For example, computer programs or other instructions may be loaded into the computer system 800 such as through a removable data storage device (e.g., a floppy disk, ZIP disks, magnetic tape, portable flash drive, optical disk such as a CD, DVD, or Blu-ray disk, Micro Electro-Mechanical Systems ("MEMS"), and the like). Thus, computer software including computer instructions may be transferred from, e.g., a removable storage or hard disc to secondary memory 480(b), or through data communication bus 802 to primary memory 480(a).

Communication module 806 allows software, instructions and data to be transferred between the computer system 800 and external devices or external networks, such as driving simulator system 200 and eye tracking system 300 (FIG. 1). Software, instructions, and/or data transferred by the communication module 806 are typically in the form of signals that may be electronic, electromagnetic, optical or other signals capable of being sent and received by communication module 806. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow the processor 470 of computer system 800 to implement the methods discussed herein for synchronizing data files as illustrated in FIG. 1, according to computer software including instructions.

Computer system 800 may perform any one of, or any combination of, the steps of any of the methods described herein. It is also contemplated that the methods according to the present invention may be performed automatically or may be accomplished by some form of manual intervention.

The computer system 800 of FIG. 4 is provided only for purposes of illustration, such that the invention is not limited to this specific embodiment. Persons having ordinary skill in the art are capable of programming and implementing the instant invention using any computer system.

Further, computer system 800 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand-held console, an MP3 player, or other similarly configured small-size, portable computing device as may occur to those skilled in the art.

The system of FIG. 1 may, in an exemplary configuration, likewise be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one user computing device. The client computer may be any device that may be used to access a distributed computing environment to perform the methods disclosed herein and may include (by way of non-limiting example) a desktop computer, a portable computer, a mobile phone, a personal digital assistant, a tablet computer, or any similarly configured computing device.

A client computer preferably includes memory such as RAM, ROM, one or more mass storage devices, or any combination of the foregoing. The memory functions as a computer readable storage medium to store and/or access computer software and/or instructions.

A client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement one or more elements of the system of FIG. 1. A cloud data center may include one or more networks that are managed through a cloud management system. Each such network includes resource servers that permit access to a collection of computing resources and components of the system of FIG. 1, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof. The cloud computing environment described above is provided only for purposes of illustration and does not limit the invention to this specific embodiment. It will be appreciated that those skilled in the art are readily able to program and implement the invention using any computer system or network architecture.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A system for synchronizing asynchronous data from a driving simulator system and an eye tracking system, the system comprising:

a driving simulator system comprising a driving interface having driving controls, a display, and computer executable driving simulator code configured to execute a driving simulation and to create a driving simulator data file for each of a plurality of drivers of said driving simulator system, wherein each driving simulator data file comprises data snapshots captured at a first time frequency;

an eye tracking system comprising a plurality of cameras and computer executable eye tracking code configured to create an eye tracking data file for each of said plurality of drivers of said driving simulator system, wherein each eye tracking data file comprises data snapshots captured at a second time frequency different from said first time frequency; and a driving behavior analysis computer in data communication with each of said driving simulator system and said eye tracking system, said driving behavior analysis computer having a processor executing computer instructions configured to:

receive one of said driving simulator data files associated with a first one of said plurality of drivers;

receive one of said eye tracking data files associated with said first one of said plurality of drivers; and generate a merged data file for said first one of said plurality of drivers, wherein said merged data file comprises data from said one of said driving simulator data files and a selection of data from said one of said eye tracking data files that most closely matches in time each data snapshot in said one of said driving simulator data files;

wherein the data merging is performed using an interpolation that selects data based on a configurable threshold value representing a largest possible difference between time variables to be merged and a configurable ratio value representing a number of records in the eye tracking data file to be compared against a single record in the driving simulator data file for temporal synchronization purposes, wherein the configurable threshold value and the configurable ratio value are selected based on specific time domain resolution of the datasets to optimize synchronization accuracy between asynchronous data streams from separate driving simulator and eye tracking systems.

2. The system for synchronizing asynchronous data from a driving simulator system and an eye tracking system of claim 1, wherein each of said data snapshots of said driving simulator data files comprises a driving simulator data file timestamp and spatial coordinates of a simulated vehicle that is operated by one of said drivers, and wherein each of said data snapshots of said eye tracking data files comprises an eye tracking data file timestamp and spatial coordinates of a gaze target of said one of said drivers.

3. The system for synchronizing asynchronous data from a driving simulator and an eye tracking system of claim 2, wherein said computer instructions executed by said processor of said driving behavior analysis computer are further configured to:
select a plurality of said data snapshots of said eye tracking data files that are closest in time to each said snapshot of said driving simulator data file in said merged data file;
compare the selected plurality of said data snapshots of said eye tracking data files to one of said snapshots of said driving simulator data file to identify a single snapshot of said eye tracking data file that is closest to said one of said snapshots of said driving simulator data file based on said timestamps; and
add data from said identified single snapshot of said eye tracking data file to said merged data file.

4. The system for synchronizing asynchronous data from a driving simulator and an eye tracking system of claim 3, said driving behavior analysis computer further comprising a data collection comprising a plurality of said merged driver data files, wherein each one of said plurality of merged driver data files comprises merged data from said driving simulator system and said eye tracking system associated with a single simulated driving session of a single driver.

5. The system for synchronizing asynchronous data from a driving simulator and an eye tracking system of claim 1, wherein said computer instructions executed by said processor of said driving behavior analysis computer are further configured to configure said merged data file for extraction and analysis of data indicative of driver behaviors, and wherein said driver behaviors further comprise driving reaction to vehicle-generated messaging selected from the group consisting of: (i) driver interaction with and reaction to a pedestrian collision warning; (ii) driver interaction with and reaction to a red light violation warning; (iii) driver interaction with and reaction to a forward collision warning; (iv) driver interaction with and reaction to a curve speed warning; and (v) driver interaction with and reaction to an instruction to retake control from automated operation of an autonomous vehicle.

6. The system for synchronizing asynchronous data from a driving simulator and an eye tracking system of claim 1, wherein said computer instructions executed by said processor of said driving behavior analysis computer are further configured to:
receive a user selection of one or more variables in said one of said driving simulator data files associated with a first one of said plurality of drivers; and
wherein said one of said driving simulator data files associated with a first one of said plurality of drivers further comprises at least timestamp data, spatial coordinate data, and data associated with said one or more variables.

7. The system for synchronizing asynchronous data from a driving simulator and an eye tracking system of claim 1, wherein said computer instructions executed by said processor of said driving behavior analysis computer are further configured to:
receive an instruction from a user applying a filter to one or more of said merged data files; and
generate a report including a filtered set of said one or more of said merged data fields.

8. The system for synchronizing asynchronous data from a driving simulator and an eye tracking system of claim 1, wherein said computer executable driving simulator code configured to execute a driving simulation and to create a driving simulator data file for each of a plurality of drivers of said driving simulator system is further configured to generate a data waypoint associated with an event of interest during a simulated driving session; and
wherein said computer instructions executed by said processor of said driving behavior analysis computer are further configured to filter said merged data files based on said data waypoint.

9. A method for synchronizing asynchronous data from a driving simulator system and an eye tracking system comprising:
receiving at a driving behavior analysis computer from a driving simulator system a driving simulator data file for each of a plurality of drivers of said driving simulator system, wherein each driving simulator data file comprises data snapshots captured at a first time frequency, wherein said driving simulator system comprises a driving interface having driving controls, a display, and computer executable driving simulator code configured to execute a driving simulation and to create said driving simulate data files;
receiving at said driving behavior analysis computer from an eye tracking system an eye tracking data file for each of said plurality of drivers of said driving simulator system, wherein each eye tracking data file comprises data snapshots captured at a second time frequency different from said first time frequency, wherein said eye tracking system comprises a plurality of cameras and computer executable eye tracking code configured to create said eye tracking data files; and
generate at said driving behavior analysis computer a merged data file for each of said plurality of drivers, wherein said merged data file comprises data from said driving simulator data file and a selection of data from said eye tracking data file that most closely matches in time each data snapshot in said driving simulator data file;
wherein the data merging is performed using an interpolation that selects data based on a configurable threshold value representing a largest possible difference between time variables to be merged and a configurable ratio value representing a number of records in the eye tracking data file to be compared against a single record in the driving simulator data file for temporal synchronization purposes, wherein the configurable threshold value and the configurable ratio value are selected based on specific time domain resolution of the datasets to optimize synchronization accuracy between asynchronous data streams from separate driving simulator and eye tracking systems.

10. The method for synchronizing asynchronous data from a driving simulator system and an eye tracking system of claim 9, wherein each of said data snapshots of said driving simulator data file comprises a driving simulator data file timestamp and spatial coordinates of a simulated vehicle that is operated by one of said drivers, and wherein each of said data snapshots of said eye tracking data file comprises an eye tracking data file timestamp and spatial coordinates of a gaze target of one of said drivers.

11. The method for synchronizing asynchronous data from a driving simulator and an eye tracking system of claim 10, wherein said step of generating at said driving behavior analysis computer a merged data file for each of said plurality of drivers further comprises:
  selecting at said driving behavior analysis computer a plurality of said data snapshots of said eye tracking data files that are closest in time to each said snapshot of said driving simulator data file in said merged data file;
  comparing at said driving behavior analysis computer the selected plurality of said data snapshots of said eye tracking data files to one of said snapshots of said driving simulator data file to identify a single snapshot of said eye tracking data file that is closest to said one of said snapshots of said driving simulator data file based on said timestamps; and
  adding at said driving behavior analysis computer data from said identified single snapshot of said eye tracking data file to said merged data file.

12. The method for synchronizing asynchronous data from a driving simulator and an eye tracking system of claim 11, further comprising the step of generating at said driving behavior analysis computer a data collection comprising a plurality of said merged driver data files, wherein each one of said plurality of merged driver data files comprises merged data from said driving simulator system and said eye tracking system associated with a single simulated driving session of a single driver.

13. The method for synchronizing asynchronous data from a driving simulator and an eye tracking system of claim 9, further comprising the step of configuring at said driving behavior analysis computer said merged data file for extraction and analysis of data indicative of driver behaviors, wherein said driver behaviors further comprise driving reaction to vehicle-generated messages selected from the group consisting of: (i) driver interaction with and reaction to a pedestrian collision warning; (ii) driver interaction with and reaction to a red light violation warning; (iii) driver interaction with and reaction to a forward collision warning; (iv) driver interaction with and reaction to a curve speed warning; and (v) driver interaction with and reaction to an instruction to retake control from automated operation of an autonomous vehicle.

14. The method for synchronizing asynchronous data from a driving simulator and an eye tracking system of claim 9, further comprising the steps of:
  receiving at said driving behavior analysis computer a user selection of one or more variables in said driving simulator data file associated with a first one of said plurality of drivers; and wherein said driving simulator data file associated with a first one of said plurality of drivers further comprises at least timestamp data, spatial coordinate data, and data associated with said one or more variables.

15. The method for synchronizing asynchronous data from a driving simulator and an eye tracking system of claim 9, further comprising the steps of:
  receiving at said driving behavior computer an instruction from a user applying a filter to one or more of said merged data files; and
  generating at said driving behavior computer a report including a filtered set of said one or more of said merged data fields.

16. The method for synchronizing asynchronous data from a driving simulator and an eye tracking system of claim 9, further comprising the steps of:
  generating at said driving simulator system a data waypoint associated with an event of interest during a simulated driving session; and
  filtering at said driving behavior computer one or more of said merged data files based on said data waypoint.

17. The system of claim 1, wherein said computer instructions executed by said processor of said driving behavior analysis computer are further configured to:
  receive a threshold value representing a largest possible difference between time variables in said driving simulator data file and said eye tracking data file;
  receive a ratio value representing a number of records in said eye tracking data file to be compared against a single record in said driving simulator data file; and
  select a plurality of said data snapshots from said eye tracking data file based on said threshold value and said ratio value for comparison with each data snapshot in said driving simulator data file.

18. The system of claim 17, wherein said computer instructions are further configured to:
  calculate a time difference between each selected data snapshot from said eye tracking data file and a corresponding data snapshot from said driving simulator data file;
  identify the data snapshot from said eye tracking data file having the smallest calculated time difference; and
  add data from said identified data snapshot to said merged data file.

19. A method for synchronizing asynchronous data from a driving simulator system and an eye tracking system comprising:
  receiving a threshold value representing a largest possible difference between time variables in a driving simulator data file and an eye tracking data file, wherein said driving simulator data file comprises data snapshots captured at a first time frequency and said eye tracking data file comprises data snapshots captured at a second time frequency different from said first time frequency and wherein said threshold value is configured based on a time interval of said first time frequency;
  receiving a ratio value representing a number of records in said eye tracking data file to be compared against a single record in said driving simulator data file, wherein said ratio value is determined based on a relationship between said first time frequency and said second time frequency;
  selecting a plurality of data snapshots from said eye tracking data file within a temporal window defined by said threshold value for comparison with each data snapshot in said driving simulator data file;

calculating a time difference between each selected data snapshot from said eye tracking data file and a corresponding data snapshot from said driving simulator data file;

identifying the data snapshot from said eye tracking data file having the smallest calculated time difference within said temporal window; and generating a merged data file comprising data from said driving simulator data file and data from said identified data snapshots from said eye tracking data file.

20. The method of claim 19, further comprising:

receiving socio-demographic data for a driver operating said driving simulator system;

correlating driving behavior data from said merged data file with said socio-demographic data; and generating a report analyzing driver behaviors in response to vehicle-generated messaging based on said correlation.

21. The method of claim 19, further comprising:

generating a data waypoint associated with an event of interest during operation of said driving simulator system;

filtering said merged data file based on said data waypoint to identify driver behavior data associated with said event of interest; and analyzing eye tracking data from said merged data file corresponding to said event of interest to determine a driver's gaze target at a time of said event.

* * * * *